UNITED STATES PATENT OFFICE.

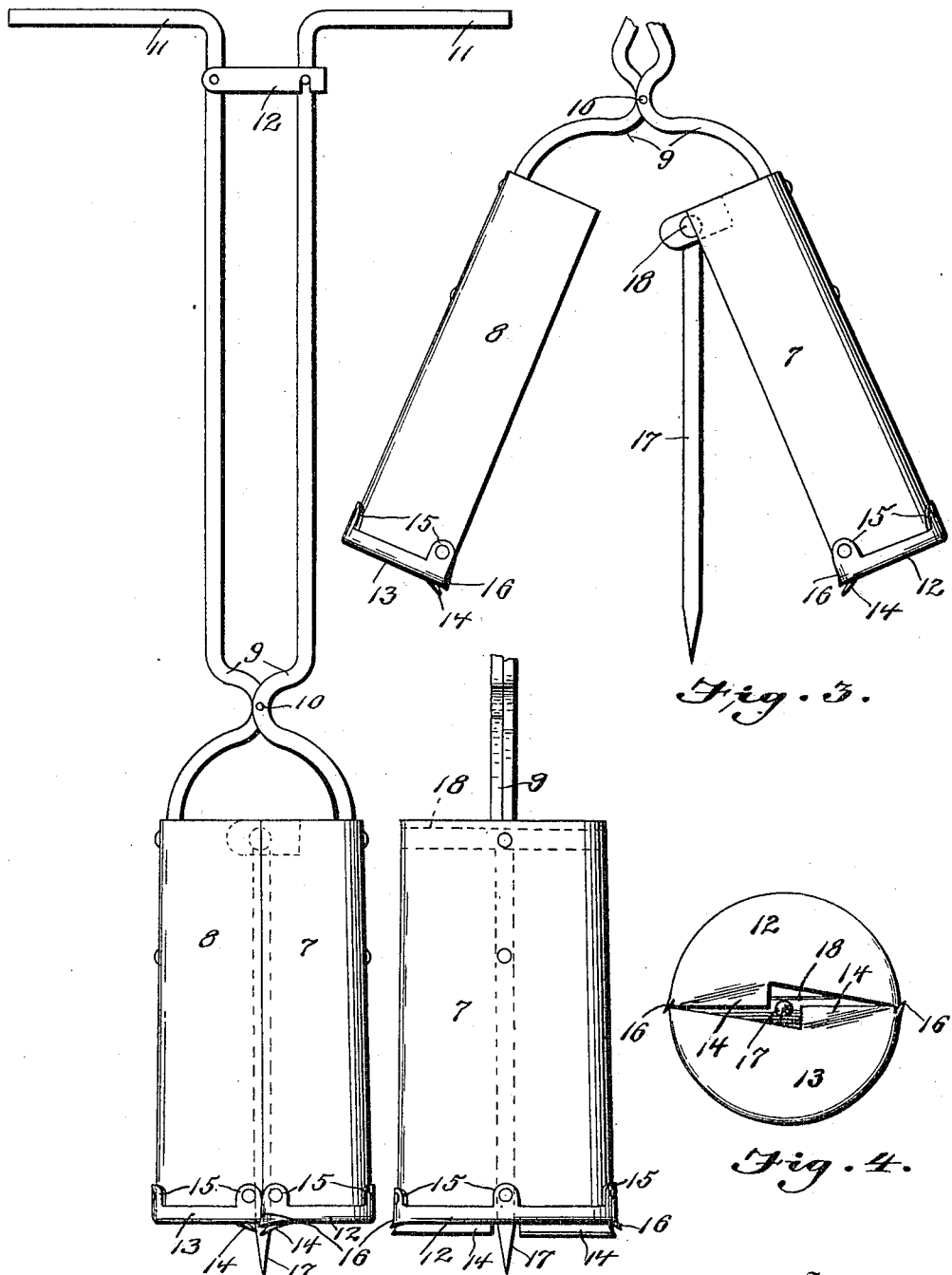

JOSEPH M. DERRYBERRY, OF GUYMON, OKLAHOMA TERRITORY.

POST-HOLE AUGER.

No. 819,739.  Specification of Letters Patent.  Patented May 8, 1906.

Application filed September 25, 1905. Serial No. 279,974.

*To all whom it may concern:*

Be it known that I, JOSEPH M. DERRYBERRY, a citizen of the United States, residing at Guymon, in the county of Beaver and Territory of Oklahoma, have invented new and useful Improvements in Post-Hole Augers, of which the following is a specification.

My invention relates to a post-hole auger, and has for its object to provide an implement of this kind embodying strength and simplicity of construction and which can be easily worked in all kinds of ground.

To this end the invention consists in certain novel features of construction hereinafter described and claimed, reference being had to the accompanying drawings, in which—

Figure 1 is an elevation showing the auger closed. Fig. 2 is an elevation taken at right angles to the preceding view. Fig. 3 is an elevation showing the auger open to discharge the material. Fig. 4 is a bottom plan view.

Referring specifically to the drawings, 7 and 8 indicate two semicircular plates which when they come together form a pocket or receptacle to hold the material which is scraped up by the auger. Shanks 9 are riveted or otherwise secured to the plates, said shanks being pivotally connected, as at 10, and their outer ends are bent sidewise, as at 11, to form handles which the operator grasps to rotate the auger and also to open and close the same. The shanks are provided with a suitable locking device 12 to hold the auger closed.

The bits or auger-points are at the lower ends of the plates 7 and 8 and comprise flat segmental plates 12 and 13, each of which has a downwardly-projecting lip 14, provided with a cutting edge which acts to scrape up the material when the auger is rotated. The lips extend substantially half-way across the plates 12 and 13 and are arranged diametrically opposite each other. Sufficient space is left between the plates to enable the material to pass into the auger. The plates have ears 15, whereby they are secured to the plates 7 and 8 by rivets or other suitable fastening means, so that they can be readily removed when worn. At one of the inner edges of the plates 7 and 8 and diametrically opposite each other the ears 15 are bent outwardly slightly, as at 16, to act as reamers, which slightly enlarge the hole, and thus prevent the auger from sticking. The auger is centered by a pointed rod 17, which extends between the bits and downwardly below the same. Said rod is fastened to a cross-bar 18, extending across and secured to the plate 7 near the top thereof.

The operation of the implement will be obvious from the foregoing description. The auger being closed and the shanks locked, it is placed on the ground and rotated, the operator grasping the handles 11. The lips 14 scrape up the soil which accumulates on top of the plates 12 and 13 in the pocket formed by the plates 7 and 8. When the auger is full, it is raised out of the ground and opened to dump its load.

The invention is simple in construction, and therefore can be cheaply made and sold. It is rapid and thoroughly efficient in operation and works readily in any kind of ground. Inasmuch as the bits are removable they can be readily replaced when worn and the expense of an entire augur thus avoided. The bits make a hole having a flat bottom, and the hole will be bored perfectly straight by reason of the centering-rod.

Having thus described my invention, what is claimed as new, and desired to be secured by Letters Patent, is—

A post-hole auger comprising a casing which is in sections, pivotally-connected shanks extending from the top of the casing-sections, a centering-rod carried by one of the sections, bottom plates secured to the sections, said plates having notches through which the centering-rod extends, and having their inner edges bent downwardly to form diametrically opposite cutting-lips, and attaching-ears extending from the bottom plates for securing said plates to the casing-sections, said ears having outwardly-projecting lips to form reamers.

In testimony whereof I have signed my name to this specification in the presence of two subscribing witnesses

JOSEPH M. DERRYBERRY.

Witnesses:
C. T. STEWART,
M. A. CASTUER.